United States Patent [19]

Hunter

[11] 4,238,003

[45] Dec. 9, 1980

[54] VEHICLE LIFT RACK

[76] Inventor: Lee Hunter, 13501 Ladue Rd., Creve Coeur, Mo. 63141

[21] Appl. No.: 61,834

[22] Filed: Jul. 30, 1979

[51] Int. Cl.[3] .............................................. B60S 13/00

[52] U.S. Cl. ...................................... 187/8.71; 254/88

[58] Field of Search .................... 187/8.47, 8.49, 8.52, 187/8.71, 8.41; 254/88, 89 R, 89 H, 5 R, 5 C, 10 R, 10 C

[56] References Cited

U.S. PATENT DOCUMENTS

| | | | |
|---|---|---|---|
| 1,903,905 | 4/1933 | Carter | 187/8.71 |
| 3,088,547 | 5/1963 | MacMillan | 187/8.71 |
| 3,282,566 | 11/1966 | Clarke | 187/8.71 |

*Primary Examiner*—Robert J. Spar

*Assistant Examiner*—Kenneth Noland

*Attorney, Agent, or Firm*—Gravely, Lieder & Woodruff

[57] ABSTRACT

A vehicle lift rack having a pair of runways supported at the front ends on stands so that the runways are slanted to receive a vehicle, and runway lifting and control mechanisms spaced from the front ends comprising pressure fluid lifting devices pushing against the underside of the runways, lift control links adjacent the lifting devices and interconnected so they follow simultaneously the lifting of the runways and limit the distance of the lift, safety members to prevent runway fall in the event of loss of pressure fluid, catch members associated with the safety members, and check links for resisting the runway tilt in the event of vehicle weight distribution across the lifting devices which might tend to raise the front ends.

7 Claims, 7 Drawing Figures

VEHICLE LIFT RACK

BACKGROUND OF THE INVENTION

Vehicle lift racks have been around for quite some time, and are extremely useful in connection with performing services on vehicles of all types. In performing such services, the rack is designed to elevate the vehicle to a convenient heighth so that service personnel can comfortably perform wheel alignment operations, brakes and wheel bearing inspection and adjustment, and certain operations with respect to lubrication. In connection with wheel alignment services, the prior art has disclosed a form of rack in which the runways can be positioned in a slanted attitude to facilitate vehicle run-on and run-off, and it can be elevated to a normal horizontal position which is required in order to accomplish accurate wheel alignment measurements and adjustments.

Prior art vehicle lift racks are exemplified by the disclosures in MacMillan U.S. Pat. No. 3,088,547 of May 7, 1963, Lill U.S. Pat. No. 3,190,395 of June 22, 1965, and its reissue patent Re 26,232, Hunter U.S. Pat. No. 3,216,530 of Nov. 9, 1965, and Lill U.S. Pat. No. 3,252,544 of May 24, 1966. Each of these prior art patents embodies a vehicle rack in which runways are movable between slanted positions and horizontal positions by means of mechanism for lifting the run-on end portions of the runways into a horizontal position substantially level with the support for the front wheels of the vehicle. The lifting mechanisms have taken a number of different forms in which piston and cylinder lifting devices have played a prominent roll. Some of the piston cylinder devices have been applied directly to the runways, while other arrangements have utilized mechanical arrangements with the runways. The prior art has disclosed operating mechanisms of a rather complicated nature requiring great care in the initial installation, and continuing vigilance during the life of the apparatus to assure its proper functioning.

BRIEF DESCRIPTION OF THE INVENTION

The present invention is directed to improvements in vehicle lift racks for facilitating servicing and care of vehicles of all types.

It is an important object of this invention to provide a vehicle lift rack with a lifting assembly embodying pressure fluid lifting means in association with a simple arrangement of mechanical means to provide the necessary protection against failure of the pressure fluid lifting means while the runways are in elevated positions.

It is a further object of the present invention to provide a vehicle lift rack of extremely simple construction in which foldable linkage is associated with pressure fluid lifting means for stabilizing and controlling the lifting and lowering of the runways.

Still another object of the present invention is to incorporate in a vehicle lift rack means to counteract any tendency that might arise by reason of vehicle weight being applied to the runways such that the runways would tend to elevate at the forward end portions.

The present invention is embodied in a vehicle lifting rack having a pair of substantially parallel runways having opposite mounting and elevating end portions, vertical stands supporting the mounting end portions so as to allow the runways to assume slanting positions as well as horizontal positions, and a runway operating assembly for each runway disposed between the mounting and elevating end portions, and including a base for supporting the pressure fluid lifting member in position where it is capable of expanding and collapsing for moving the runways, extensible and foldable link means extending between the base and said runways for directing the elevating and lowering movement and limiting the extent of elevating movement of the runways, first means movable into and out of positions beneath the runways to guard against undesired runway lowering, and second means extending between the base and the runways for checking the tendency of the runways to lift at the mounting end portions due to the location of the vehicle weight accessibly close to the elevating end portions.

BRIEF DESCRIPTION OF THE DRAWINGS

A preferred embodiment of the present invention is disclosed in the accompanying drawings, wherein.

DETAILED DESCRIPTION OF THE EMBODIMENT

Figure 1:
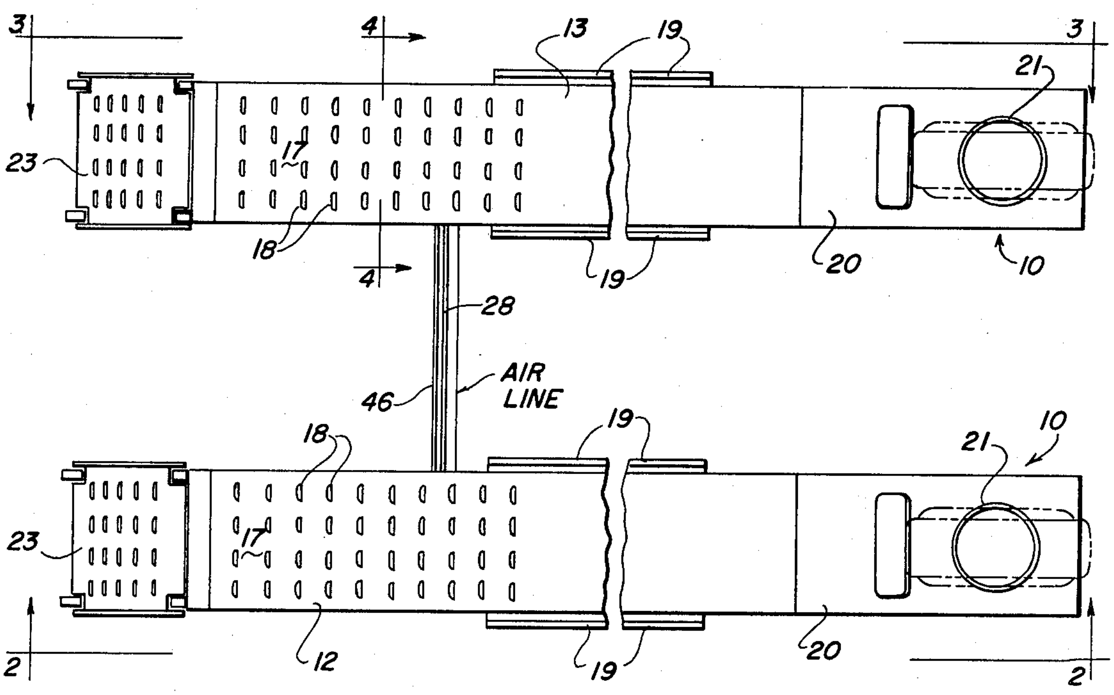
FIG. 1 is a plan view of the vehicle lift rack embodying the present improvements.
Figure 2:
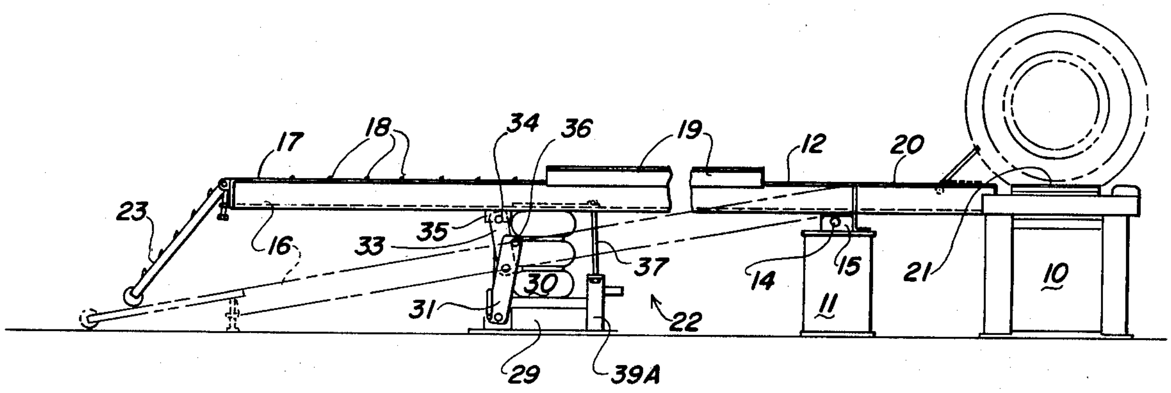
FIG. 2 is a longitudinal elevational view of the present vehicle lift rack as seen from the right side thereof.
Figure 3:
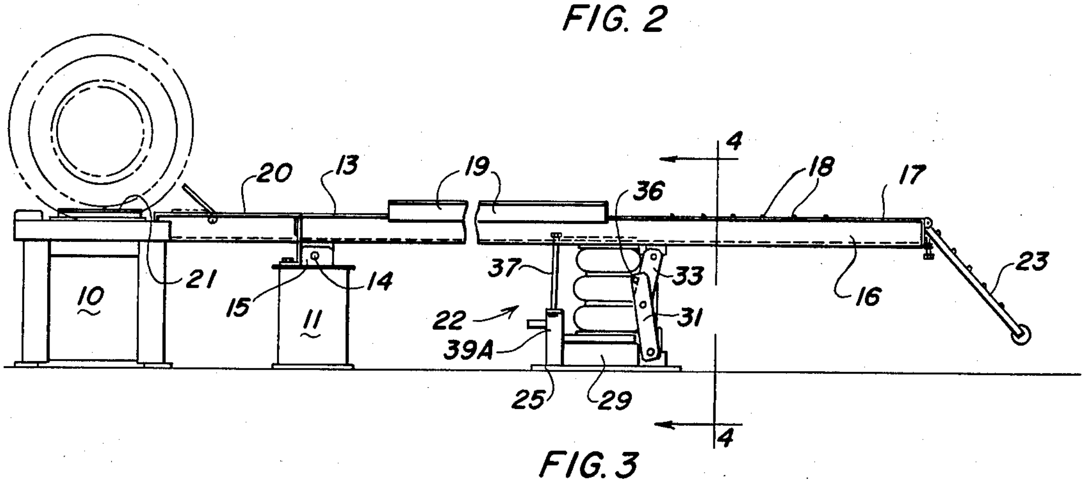
FIG. 3 is a longitudinal elevational view of the vehicle lift rack as seen from the left side.

Referring to FIGS. 1, 2 and 3 the vehicle lift rack includes front wheel supporting stands 10, front runway stands 11, and elongated runways 12 and 13 in which the runway 12 is at the right side and runway 13 is at the left side. The mounting ends of the runways are connected to front runway stands 11 by pivot shafts 14 which are supported in bearing blocks 15 secured to the upper surface of the stands 11. It can be seen in the various drawing views that each runway is constructed with an upwardly opening channel 16 and an elongated tread plate 17 which has been suitably formed with tread projections 18 so that vehicle tires will obtain adequate grip when the runways are in the slanted (dotted outline) position. Each runway is provided with a safety curb 19 along its opposite margins in the lengthwise area so as to prevent the vehicle front wheels from being steered off the tread plates 17. The front stand 10 aligned with each runway 12 and 13 is connected to the associated front runway stands 11 by a removable bridge 20 for the purpose of permitting the vehicle wheels to move onto the front stands where turn plates or other suitable support means 21 can be installed as part of the wheel alignment equipment.

Each runway is provided with a lift assembly 22 located inwardly from the elevating end portion which is adapted to receive the vehicle wheels on pivotally mounted ramp structures 23. The lift assemblies 22 associated with each runway 12 and 13 are substantially identical and a description of one thereof will be understood to apply equally to the other assembly. Accordingly, similar reference characters will be applied to similar parts in these assemblies.

Turning now to FIGS. 3 to 6, the lift assembly 22 for runway 13 includes a base 25 which may be secured to the shop floor. The base carries bearings 26 and 27 for receiving a shaft 28. Also the base 25 is provided with a support 29 for a pressure fluid expandable-collapsible bag member 30 which extends upwardly into abutment with the runway channel 16 midway of the width of the channel 16. Since the bag member 30 has to be sufficiently flexible to collapse (FIG. 6) for the purpose of lowering the runway 13, there is provided stabilizing means in the form of links 31 having the lower ends mounted on the shaft 28. The links 31 extend upwardly and are connected at pivot elements 32 to the lower end of links 33. The upper end of each link 33 is pivotally supported on a shaft 34 which is supported in bearing blocks 35 secured to the underside of the runway channel 16. It can be seen in FIG. 5 that the links 31 and 33 are prevented from moving into a straight line position by means of a stop element 36. The stop element 36 is necessary in order to prevent the links from folding in an undesired direction, since it is desired that the links fold (FIG. 6) into a position within the limits of the base 25.

It can be seen in the various views of the drawing that the links 31 and 33 are positioned between the bag member 30 and the elevating end portion of the runway 13. Since there is a substantial distance of overhang between the position of the links 31 and 33 and the run-on ramp 23, it is possible for a long wheel base vehicle to have one set of wheels located in this overhang portion of the runway. The vehicle weight, as a consequence, would have the tendency to exert a lift on the mounting end of the runway 12, eventhough the stand 11 is securely anchored to the floor. The present lifting assembly is adapted to counteract the lifting force that may be applied to the front runway stands 11 by means of one or more links 37 having one end 38 engaged in the runway channel 16, and its opposite end 39 engaged in a upwardly extending bracket 39A secured at its bottom end to the base 25. When the bag member 30 is fully expanded upon being supplied with pressure fluid in line 65 from a suitable source under control of the usual 3-way valve device used in vehicle lift racks, and the links 31 and 33 are also in the fully extended positions, it is desired to adjust the link 37 so that it is under a desired degree of tension. The adjustment can be accomplished at either end 38 or 39 during the initial installation of the vehicle lift rack. The bracket 39A is purposely made to have a limited amount of vertical height so that when the runway 12 is in its lowered position the link 37 will have its end 39 move downwardly in the bracket 40 until it bottoms on the base 25. Thereafter any additional take up in the length of the link 37 wll be obtained by the end 38 moving upwardly in the channel 16.

Figure 4:
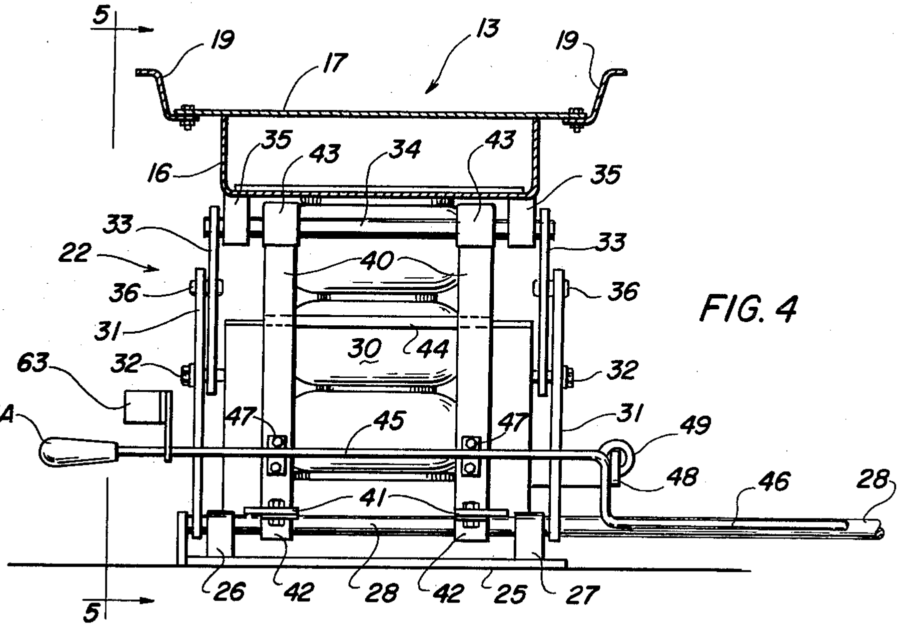
FIG. 4 is a transverse sectional view as seen along the line 3—3 in FIG. 1.

Turning now to FIGS. 1 and 4 in particular, it can be seen that shaft 28 extends across the space between the runways 12 and 13 and is suitably mounted in the companion base 25 for the runway 13 as above described. Furthermore, the lift assembly 22 associated with the runway 12 is provided with links 31 and 33 having the same installation arrangement as above described. The links 33 are suitably mounted on shaft 34 attached by bearing blocks 35 to the runway channel 16, and stop elements 36 are provided to prevent the links 31 and 33 from attaining a straight line position. The shaft 28 is fixedly secured to the links 31 associated with the lift assembly 22 for each runway so that the links move in unison and cause the runways 12 and 13 to move together.

Each lift assembly 22 incorporates one or a pair of safety struts 40, each of which is supported at its lower end on shaft 28 through a bearing plate 41 secured on the shaft 28 by a keeper 42. The plate and keeper are arranged to permit pivoting movement of the struts 40 relative to the shaft 28, and yet the plates 41 absorb the vertical load that may be transmitted to the struts 40 from saddle elements 43 attached to the upper ends of the respective struts. The saddles 43 are adapted to engage shaft 34 (FIG. 4) when in the operative positions, thereby preventing folding of the links 31 and 33 should the pressure fluid bag mamber 30 lose pressure. The pair of struts 40 at each runway are interconnected by member 44 so as to move together.

The struts 40 for each of the lift assemblies 22 are interconnected by the off-set ends portions 45 of a rod 46 which extends (FIGS. 1 and 4) across the space between the runways 12 and 13. The center span of the rod 46 has its axis positioned as close as is practical to the axis of the shaft 28. It can be seen from the drawings that the struts 40 are caused to move together because of the interconnection through the off-set ends 45, and in so moving the ends 45 swings in an arc having a radius substantially equal to the amount of off-set from the center span of rod 46. The opposite off-set ends 45 are suitably attached to the struts 40 by being welded to plates 47 and plates 47 are suitably bolted to the struts 40. It can be seen in FIG. 4 that the rod 46 is provided with a link 48 extending in a direction toward the bracket 39A whereby a spring 49 can have one of its ends anchored in the link 48 and its opposite end attached to the arm 50 carried by the bracket 39A. The spring 49 is adapted to constantly rotate the off-set ends 45 upwardly about the axis of the center portion 46 so as to lift the struts 40 upwardly toward the shafts 34 under the runways 12 and 13 and seat the saddles 43 under the shafts 34.

Figure 5:
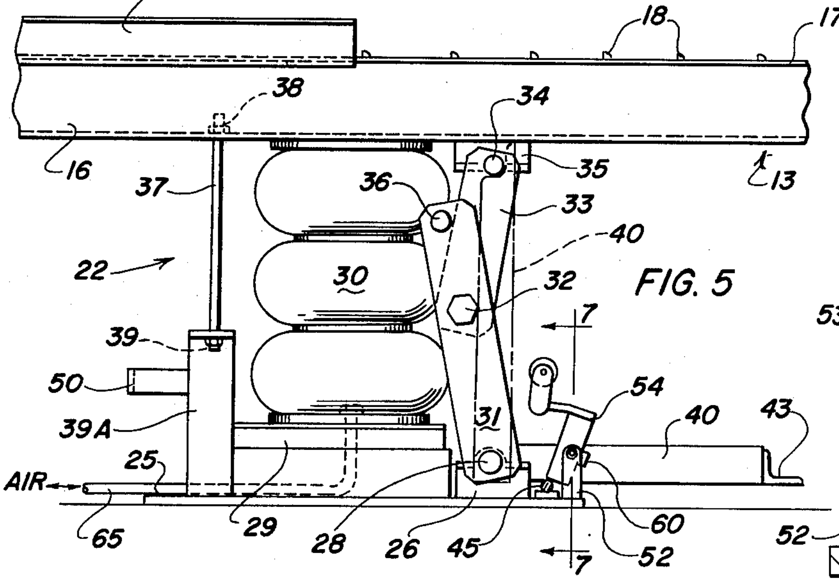
FIG. 5 is a fragmentary elevational view of the lift assembly seen along line 5—5 in FIG. 4.
Figure 7:
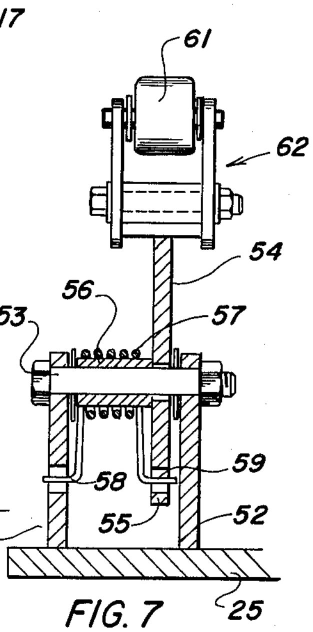
FIG. 7 is a detail view of the latch means seen along line 7—7 in FIG. 5.
Figure 6:
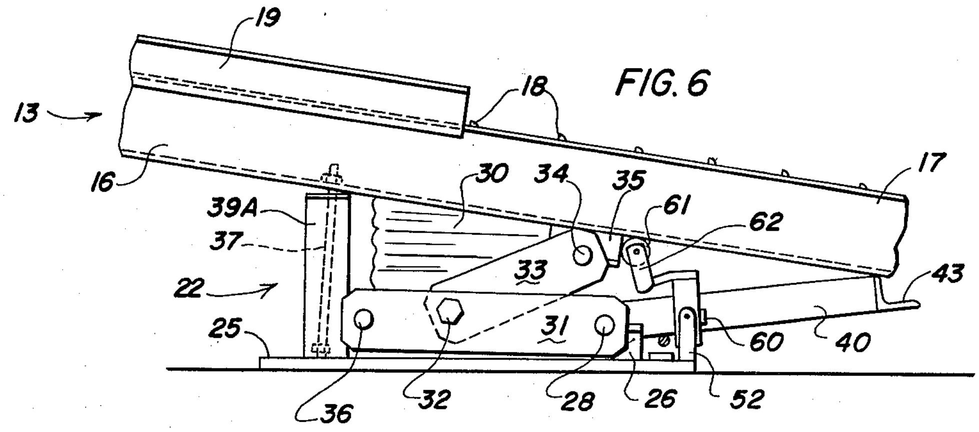
FIG. 6 is a fragmentary elevational view of the lift assembly in collapsed position.

It will be observed in FIGS. 5 and 7 that the base 25 for the left hand runway 13 is provided with spaced lugs 52 which are adpated to support a shaft 53 carrying a latch arm 54 having a lower end 55 positioned to be engaged by and to retain the off-set portion 45 of the rod 46 such that the latch arm end 54 will oppose the effort of the spring 49 to swing the off-set end portion 45 upwardly as it would normally do to elevate the struts 40. The latch arm shaft 53 is mounted in a suitable bushing 56 which supports a coil spring 57. One end 58 of the spring 57 is engaged in one of the lugs 52, and the opposite end 59 of the spring is engaged adjacent the end 55 of the latch arm. The spring 57 urges the latch arm 54 in a clockwise direction against a stop element 60 on the arm striking one of the lugs 52, as viewed from FIGS. 5 and 6, but it is yieldable when the off-set portion 45 is moved down to a position where it will pass under and be held by the latch arm end 55. The outer end 45A of the off-set portion 45 of rod 46 (FIG. 4) extends outwardly to a position where it can be manipulated either by hand or by the pressure of a foot to swing the off-set portion 45 and the struts 40 from the vertical position to near a horizontal position, thereby actuating the latch arm 54 to hold the struts in the horizontal position for permitting the runways 12 and 13 to be lowered. This mechanism provides a method of assuring the runways being retained in the raised position until it is desired to lower the runways, and the lowering operation cannot take place until the struts 40 are moved to the horizontal position (FIG. 5) and held by the latch arm 54 against the force of the spring 49. As the runway 13 drops down to the inclined position of FIG. 6, the channel 16 will engage a roller 61 mounted in a bracket 62 attached to the latch arm 54. The roller 61 is positioned by the bracket so when it is engaged by the descending runway channel 16 it will force the latch arm 54 to swing in a counter clockwise direction, thereby retracting the end 55 of the arm 54 so the off-set portions 45 of the rod 46 will be free to swing up and raise the struts 40 as above described. When the struts 40 are in the raised safety position, a colored flag 63 (FIG. 4) will be raised to visually indicate the position of the struts 40.

While the foregoing description has shown a presently preferred arrangement of components, it should be understood that some modifications are entirely permissible without detracting from the scope of the invention. For example, the links 37 may be eliminated entirely in view of the fact that the front runway stands 11 are securely anchored to the shop floor by suitable means which it is believed is not necessary to illustrate. It is to be understood that the elimination of the links 37 may call for the location of the foldable links 31 and 33 to be positioned at a convenient place between the front runway stands 11 and the fluid pressure bag members 30. Furthermore, it is not necessary that the links 31 should be mounted on the shaft 28, but that they may be secured in bearing blocks disposed at some other location on the base plate 25, and the upper links 33 may be secured at some corresponding location on the underside of the channel 16. In addition to the foregoing modifications, it should be recognized that the struts 40 may be positioned at some other suitable location so long as they are operable to extend between a base plate on the shop floor and the underside of the runway channel 16. The relocation of the struts 40 will entail relocating the rod 46 so that its off set end portions 45 will remain in operative association with the struts 40 for the purpose of automatically elevating the struts into the safety position through the effort of the tension spring 49 extending between the link 48 and the arm 50 carried by the bracket 39A. Any relocation of the rod 46 and its off set end portions 45 will call for a corresponding relocation of the latch 54, all as will be understood from the foregoing description. It should be understood further that the coordinating means in the form of the shaft 28 for effecting simultaneous extension and folding of the links 31 and 33 may be modified so that instead of relying on a solid shaft interconnection, a flexible cable system may be employed for obtaining the coordinated simultaneous operation of the links 31 and 33.

The foregoing specification has set forth a presently preferred embodiment of the vehicle lift rack in which the safety features for preventing accidental dropping of the runways is an important part, along with other structural and operational components. It is intended to illustrate generally the preferred embodiment with an understanding that the above modifications may be adopted without imposing unnecessary limitations.

What is claimed is:

1. In a vehicle lifting rack: a pair of runways in spaced parallel positions and having front ends and rear ends; elevated stands pivotally supporting said runways front ends such that said runways are in slanted positions with the rear ends lower for vehicle run-on and run-off maneuvering; a base located beneath each runway spaced from said rear ends; lifting means carried by each base and engaged under the associated runway for operating said runways between slanting and raised positions; a shaft extending between and operably carried by said bases; first links having lower ends secured to said shaft beneath said runways; second links having upper ends secured to said runways; means pivotally connecting said first and second links for movement between folded positions with said runways in slanted positions and extended positions with said runway raised for limiting the extent of the runway lift by said lifting means, said shaft coordinating the movement of said first links for substantially simultaneous movement relative to the movement of said runways; safety strut means supported by and movable relative to said shaft beneath said runways and movable into safety positions preventing lowering of said runways; means interconnecting said safety strut means for each runway; resilient means connected to said interconnecting means to cause substantially simultaneous movement of said safety strut means into safety positions upon lifting of said runways; and latch means carried by one of said bases in position to engage said interconnecting means upon movement of said safety strut means out of safety position in opposition to said resilient means such that said safety strut means is held out of runway safety position to permit runway lowering to the slanted positions.

2. The vehicle lifting rack as set forth in claim 1, wherein check means is positioned between each runway and said base in a position between said elevated stand and said lifting means for resisting vehicle load on the runways adjacent to the rear ends of said runways exerting an undesired lifting force at said front end of said runways.

3. In a vehicle lifting rack: a pair of substantially parallel runways, each having opposite mounting and elevating end portions; vertical stands supporting said mounting end portions for allowing said runways to assume vehicle run-on and run-off slanting positions and substantially horizontal raised positions; runway operating means associated with said runways including a base under each runway, a pressure fluid lift member on each said base and extending to engage the adjacent runway and being capable of expanding and collapsing to move said runways; extensible and foldable links connected to each said base and to said adjacent runway for following the elevating and lowering of said runways and limiting the extent of runway elevation by said lift member, and safety strut means having lower pivotally mounted ends and upper ends movable into and out of a position beneath said runways to prevent runway lowering, said safety strut means being resiliently lifted in a direction from a retracted position to follow runway elevating movement and engage under said runways; and latch means on one of said bases in position to retain said safety strut means in retracted position, said latch means being operable by a lowered runway to disable said latch means such that said safety strut means is conditioned to be released to move out of the retracted position to follow elevating movement of said runway.

4. The vehicle lifting rack set forth in claim 3, wherein checking means is operably mounted between each of said bases and said runways, said checking means being located between said vertical stands and said lifting members for checking the tendency of a vehicle to impose substantial load on said runways adjacent said elevating end portions such that lifting force is exerted on said vertical stands.

5. The vehicle lifting rack set forth in claim 3, wherein shaft means extends between said bases in position to act as the pivotal mounting for said lower ends of said safety strut means to cause said safety strut means to move substantially in unison; and said resilient lifting of said safety strut comprises a rod extending between said bases and having off-set end portions secured to said safety strut means above said shaft means, and a spring connected to an off-set portion of said rod and to an adjacent base.

6. In a vehicle lift rack: a pair of runways having front and rear ends; a raised stand positioned adjacent said front ends of each runway; a pivotal connection between the front end of each runway and the adjacent stand; a fluid pressure lift member spaced inwardly from said rear end of each runway and engaged beneath the runways for raising and lowering said runways about said front end pivotal connection; a base supporting each of said lift members; first links pivotally connected to each of said base supports; second links pivotally connected to each of said runways and being pivotally interconnected with adjacent ones of said first links; stop means carried by certain of said links in position to limit the extension of said first and second links to a distance such that said lift members are extended to a height substantially matching said stands, said links being foldable to allow said lift members to collapse and said runways to be lowered to a slanting position for vehicle run-on and run-off maneuvering; means opeeratively interconnecting said links and extending between said runways and carried by each of said bases for coordinating the extension and folding of said links to substantially simultaneous movements; runway check means connected to said base supports and engaged with said runways for opposing the weight of a vehicle supported on said runway rear ends tending to lift said runway front ends means preventing lowering of said runways when the runways are in a raised position; and latch means carried by one of said bases and operably coupled to the lowering preventing means so that upon manual operation of the latch means the lowering preventing means is held out of the way of the runways to permit the lowering of the runways.

7. In a vehicle lift rack having a pair of vehicle wheel runways in spaced apart and parallel relation, and raised stands positioned adjacent forward ends of said runways for pivotally supporting such ends to position said runways in a slanting position for vehicle run-on and run-off maneuvering; the improvement for raising and lowering said runways which comprises a base under each runway, pressure fluid lift members disposed between said bases and said runways, said lift members being located inwardly of a rearward end of the associated one of said runways, pivotally interconnected link means operably connected between said bases and said runways for limiting the lift of said runways by said lift members to a heighth substantially matching said raised stand, safety means operably supported adjacent said bases and having a free end upwardly movable to a safety position beneath the raised position of said runways for preventing fall of said raised runways, resiliently operable means connected to said safety means for automatically lifting said free end of said safety means upwardly into said safety position as said runway is lifted, manually movable means connected to said resiliently operable means for moving said safety means out of position beneath said runways, latch means operable to retain said safety means out of position beneath the raised runway in response to said manually movable means moving said safety means for permitting lowering of said runway to its slanting position, and means on said latch means in the path of and engaged by movement of said runway into its slanting position for actuating said latch means to release said safety means whereby said safety means is free to be moved by said resilient moving means into position beneath said raised runway.

* * * * *